United States Patent
Oshima et al.

[15] 3,699,203
[45] Oct. 17, 1972

[54] PROCESS FOR PRODUCTION OF MATRIX MOLDING BOARD

[72] Inventors: Keiji Oshima, Toyonaka; Shozo Yamada, Chigasaki; Fujio Sakurai, Fujisawa; Yoshisuke Iwasa, Sagamihara; Koichi Horiuchi; Unosuke Uchida, both of Yokohama; Teruhiko Nomura, Kamakura; Yasushi Tominaga, Yokohama, all of Japan

[73] Assignee: Sumitomo Bakelite Company Limited, Tokyo, Japan

[22] Filed: Feb. 10, 1970

[21] Appl. No.: 10,268

[30] Foreign Application Priority Data

| Feb. 15, 1969 | Japan | 44/10786 |
| Feb. 15, 1969 | Japan | 44/10788 |
| Feb. 15, 1969 | Japan | 44/10787 |
| Dec. 27, 1969 | Japan | 44/104844 |
| Dec. 27, 1969 | Japan | 44/104845 |
| Dec. 27, 1969 | Japan | 44/104846 |
| Dec. 27, 1969 | Japan | 44/104847 |

[52] U.S. Cl. ............264/112, 264/113, 264/115, 264/119, 264/134
[51] Int. Cl. .............................................D04h 1/60
[58] Field of Search......264/112, 113, 121, 115, 119, 264/134

[56] References Cited

UNITED STATES PATENTS

| 3,453,355 | 7/1969 | Rudolff | 264/121 |
| 2,301,951 | 11/1942 | Isman | 264/113 |
| 2,746,895 | 5/1956 | Duvall | 264/113 |
| 2,309,571 | 1/1943 | Bruce et al. | 264/113 |
| 3,562,375 | 2/1971 | Guy et al. | 264/112 |

*Primary Examiner*—Robert F. White
*Assistant Examiner*—J. R. Hall
*Attorney*—Karl W. Flocks

[57] ABSTRACT

A mixture comprising fibrous materials and a thermosettable resin is refined and the refined, i.e. reduced to a fibrous condition, composition is dry-formed into a mat. The resulting mat is then compressed at 80° – 150° C. to form a base, the conditions of this treatment being such as to allow said thermosettable resin to remain uncured enough to be molded into a matrix.

The thus obtained base is made into a matrix molding board by coating over the base a molding mixture prepared from a thermosettable resin and a filler. On the other hand, the surface layer of matrix molding board may be made by sprinkling the powdery molding mixture on said mat, and if necessary, the layer on the mat is sintered at 80° – 150° C., or by applying a sheet impregnated with the molding mixture on said mat, and the thus treated mat having a surface layer thereon is compressed into a matrix molding board.

A very effective method for preventing the warp of the molded matrix is to provide a balance layer by making a layer of molding mixture on the back side of the mat or base or by applying a sheet impregnated with a thermosettable resin on the back side.

A matrix having excellent properties can be obtained by using a metal plate, net wiring or both in the molding. The metal plate used here has perforated holes or both perforated holes and grooves.

8 Claims, No Drawings

PROCESS FOR PRODUCTION OF MATRIX MOLDING BOARD

This invention relates to a process for the production of a matrix molding board.

For letterpress printing, there are various kinds of plates such as stereo type, line cut, halftone block, four-color halftone, plastic printing plate, rubber plate as well as type matter. Stereo type, plastic printing plate and rubber plate are manufactured by duplicating original forms from the matrices of their own. If plates are good or bad depends upon whether the employed materials of the plates are good or bad; however, for the most part, it depends upon the quality of matrix molding boards which is very important in order to reproduce the original form. For this reason, much investigation about a matrix molding board has been done. For stereo type, a paper matrix is employed. For the plastic printing plate or rubber, a matrix molding board having a surface layer of a thermosettable resin on a base is widely used. This matrix molding board has been much discussed so far, but still remains unsatisfactory, and an improvement is now required.

To provide a base for a matrix molding board, which has a very important influence on molding a matrix, there have conventionally been used two methods of manufacture. One such method involves forming a sheet having the desired thickness from a beater pulp-resin composition which consists of a thermosettable resin or a molding mixture prepared from a thermosettable resin and a filler and a beater pulp.

However, this method has disadvantages of having to use so great a quantity of water in sheeting that the loss of resins may be very large and hence, the method is not economical; of being unable to have a proper quantity of resins contained in sheets because the resin flows into the water; and lowering of the curability of the resin because the resin partly flows into the water and the curing agent dissolves in the water. For this reason, a solid novolac type phenolic resin which is made water insoluble by a proper control of reaction is used. But when a resol type phenolic resin is used, it becomes very difficult to get a base of good quality because the pot life of the resin is short, and the curability of the resin lowers because some parts of the reactive compound having a methylol group dissolve into the water. On the other hand, when a novolac type phenolic resin is used, there is such a disadvantage that the curability of the resin contained in a base is remarkably low, because the curing agent employed, hexamethylenetetramine, is so water soluble that it dissolves into the water while sheeting, and therefore it follows that the sheeting is effected at a low rate of the curing agent to the resin.

The fact that the curability of the resin is not enough means that it takes a long time for the matrix molding board to be molded into a matrix, and besides, when a rubber or plastic printing plate is molded, by use of the matrix, so-called collapse happens and causes an ink to be left in the place that should not be printed.

The other way of manufacturing a base involves impregnating a melamine resin or urea resin or phenolic resin into a card board, or building up sheets of paper which are impregnated with the resins to the desired thickness and then compressing the sheets of paper. In the former case, there is a disadvantage that it is usually so difficult to impregnate the resins uniformly into the core of the card board that a matrix from the card board cannot have the desired properties. In the latter case, there is such a disadvantage that the base cannot have the needed plasticity on heating, and the types of an original form are destroyed.

In the conventional matrix molding board, there are many disadvantages in addition to those that have been described above. First, when a surface layer of a molding mixture is made on the base, the base must be coated therewith and dried, so that various cure-stage resins are formed in the matrix molding board, and adversely affect molding a matrix. Second, since the surface of the matrix molding board is not flat, it is very difficult to reproduce the original pattern faithfully. Third, molding a matrix is adversely affected by the warp of the matrix molding board on drying. Further, because warp also appears over the matrix, the plastic plate or rubber plate having faithful patterns cannot be obtained, and a large space is required for preserving such a matrix.

Furthermore, a matrix is generally molded by compressing between a pair of hot platens a matrix molding board sandwiched by an original form and a metal plate, the surface layer of said matrix molding board being faced to the original form. However, blisters or convex inflation easily appears on the matrix because the gas generated on molding cannot escape from the matrix. Such blisters or convex inflation causes a failure to mold a satisfactory printing plate.

An object of this invention is to provide a method for producing a base for a matrix molding board, excellent in curability and in plasticity on heating.

Another object of this invention is to provide a method for producing at low cost a matrix molding board which is excellent in curability and in plasticity on heating and able to produce a matrix on which the original pattern is faithfully reproduced.

A further object of this invention is to provide a method for producing a matrix molding board with no warp or latent warp.

A still further object of this invention is to provide a process for molding a matrix which has neither blisters nor convex inflation.

According to this invention there is provided a method which comprises mixing fibrous materials and a thermosettable resin, the resulting mixture after being dried being in the form of chips, refining or reducing to fibers said mixture, and dry-forming the refined composition into a mat, and then compressing the mat at 80° – 150° to form a molding board base; the conditions of this treatment being such that said thermosettable resin is allowed to remain sufficiently uncured enough to be subsequently remolded into a matrix. The term "dry-forming" means that a mat formation is effected with air as a fiber conveying and distribution medium; and the word "dry" in the term "dry-forming" does not refer to the condition of the fiber, but to the condition of the fiber conveying medium. A matrix molding board is prepared by coating the thus obtained base with a molding mixture prepared from a thermosettable resin and a filler. A matrix molding board may be alternatively obtained by applying a layer of a molding mixture or a sheet impregnated with a molding mixture to the surface of the mat, and then compressing the thus treated mat having such a layer thereon under the conditions as described before.

In order to prevent the warp from appearing on a matrix molding board on drying or on a matrix molded therefrom, it is very effective to form a layer to balance against the surface layer, for example, by making a layer of molding materials on the back side of the base or by applying a sheet impregnated with a thermosettable resin on the back side.

When a powdery molding mixture is applied to the surface of the mat, it is convenient to sinter the molding mixture on the mat at 80° – 150° C. while leaving the mixture uncured before the step of compressing in order to prevent the mixture from scattering.

The fibrous materials used in the invention are inorganic and organic fibers such as glass, asbestos, cotton, wood, wool, synthetic and regenerated fibers. These fibers may be used in various forms, such as fiber, textiles, yarn, cotton wool, rock wool, glass wool, wood pulp, cotton pulp, rayon pulp and paper.

The thermosettable resins employed in the present invention are phenolic resins, amino resins, epoxy resins and unsaturated polyester resins. When they are mixed with fibrous materials and the resulting mixture is refined to fibers, the mixture is not cohesive at room temperature, but is cohesive at a temperature of 90° – 150° C.

In this invention, the amount of the resin mixed with fibrous materials is 10–90 percent by weight, preferably 20–70 percent by weight based on the whole amount of the mixture. One or more fibrous materials are used in the form of a suitable length fiber. In mixing, a filler, a lubricant and a coloring agent may be suitably added if required.

The filler used above is such as powdery silica, alumina, calcium carbonate or wood flour. The molding mixture which forms the surface layer of a matrix molding board is obtained by mixing a thermosettable resin and a filler, adding, if required, a lubricant and a coloring agent, and then pulverizing the mixture; said molding mixture being cohesive at 90° – 150° C. The fillers used in the present invention are wood flour, powdery silica, calcium carbonate, wood pulp, cotton pulp and regenerated pulp, and the thermosettable resins used in the present invention are those which have been already described before. The ratio of the filler to the resin is 20/80–80/20 by weight. The base sheet used in this invention includes fibers or non-woven fibers of various materials such as cotton, hemp, regenerated acetate rayon, viscose rayon, nylon, polyurethane, polyvinyl alcohol and polyester. As for the papers, ordinary papers made from wood pulp and rayon pulp may be used. As for the thermosettable resins which are impregnated into the sheet used as a balance layer in order to prevent the warp from appearing on a matrix or a matrix molding board, the various kinds of resins that have been already described before may be used. The amount of the resin impregnated into the sheet is 10–90 percent by weight, preferably 30–70 percent by weight based on the total weight.

The number of sheets of paper and the kind of paper may be varied according to purposes. In this invention, fibrous materials and a thermosettable resin are uniformly mixed by using a usual mixer, e.g., a two-roll mixer, a kneader and a mixing blender. At this time, a solvent like an alcohol may be used for improving impregnation. After mixing, the mixture is dried if required. The mixture in the form of chips is then refined by means of a disk-refiner or a pulverizer. The refined composition consists of fine fibers and a thermosettable resin attached thereto evenly. Said composition is allowed to fall down over a carrier by an air-felter or a carding-machine to a certain thickness which is controlled by a shaver. If necessary, the resulting mat is compressed at room temperature or a higher temperature without letting the resin melt in order for the mat to be easily handled. Thereafter, said mat is compressed at a temperature at which the thermosettable resin is melted between two hot platens with a spacer having a fixed thickness, whereby a base is obtained. A matrix molding board is obtained by coating a molding mixture over the obtained base. The surface layer of said molding mixture may also be formed in one of the following manners: (1) sprinkling the surface of the obtained mat with a powdery molding mixture, (2) spraying a paste molding mixture on the mat, (3) coating the mat with the paste molding mixture by means of a roll coater or a flow coater, (4) applying a sheet impregnated with a molding mixture to the mat.

After the surface layer of said molding mixture is formed on the mat, the thus treated mat is compressed to obtain a matrix molding board in the same way as to obtain the base. When a balance layer is formed on the base in order to prevent the warp from appearing, the mat must be heated. A matrix molding board having a balance layer may be made by one of the following methods: (1) The mat with the surface layer is placed on the balance sheet impregnated with the thermosettable resin and then heated and compressed thereon. (2) A mat (a) without surface layer is dry-formed, a layer of a molding mixture (b) is formed thereon, a mat (c) is further formed on the layer (b) and finally another layer of the molding mixture (d) is formed on the layer (c). The weight ratios of (a), (b), (c) and (d) are (c):(a)=1–10:1, (b):(d)=¼–4:1, and (c):(d)=5–20:1, preferably (c):(a)=3–8:1, (b):(d)= 1–2:1 and (c):(d)=10–15:1. As for the sintering, it is effected by heating the surface layer made of the powdery molding mixture by means of an infrared ray lamp or an electric heater.

The conditions of the heating and compressing depend on the kinds of resins. The suitable temperature for compressing is 80° – 150° C., at which the resin becomes molten but still remains uncured enough to be molded, so that it is possible to obtain a matrix having excellent properties. The molding of a matrix is carried out by putting a matrix molding board on an original form so that the surface layer of the matrix molding board contacts the original form, and covering the back side of the board with a metal plate, net wiring, or both, and compressing them between a pair of hot platens; the metal plate used has perforated holes or has both perforated holes and grooves. In case the plate has grooves, the back side of the board is contacted with the surface of the plate opposite to its surface having grooves. When both net wiring and a metal plate are used, the latter must be applied first, and then the former must be put on it. In this process, it is possible to mold a good matrix which has neither blisters nor convex inflation.

The metal plates used in this invention include copper, stainless steel, zinc, aluminum and brass plates. The suitable diameter of the perforated holes is 0.5–1.5mm, and the groove may be suitably fabricated in a width of 1–3mm and a depth of 0.5–1mm. Many patterns and designs of the holes and the grooves can be considered, but it is most suitable to make the hole space or the groove space about 3–20mm; the shape of the groove is preferably a grid, or a combination of concentric circles and radial streaks, and holes may be provided at these cross points.

As for the wire netting, any one having 10–100 mesh is usually used.

According to this invention, the factors of hindering the resin from curing cannot be considered at all, and the present method has such advantages that the curability of the resin as it is molded can be utilized, various fibers can be used for the base and the proportion of the fibers can be varied optionally, a base excellent in plasticity on heating can be obtained because the fibers are bonded after they are allowed to fall down and lie in all directions. In addition, this invention is characteristic of being able to obtain the smooth surface enough to reproduce even the details easily because the surface layer is formed by compressing, and being very advantageous economically because the production of bases and the formation of the surface layer can be carried out at the same time. Besides, it is possible to obtain the matrix with no warp and having no blisters or convex inflation by using the metal plates.

The following examples illustrate the present invention.

EXAMPLE 1

A novolac type phenolic resin 7.5kg, hexamethylene tetramine 1.13kg and methanol 7.5kg are mixed to prepare an uniform varnish. Linter pulp 7.0kg, 5mm-long asbestos fiber 5.6kg and suitable amounts of a lubricant and a coloring agent are mixed, into which is added the above varnish and is uniformly mixed. The obtained mixture is dried for 30 minutes at 80° C. This mixture is subsequently refined to fibers by means of a disk refiner, and evenly dry-formed over a carrier in a proportion of 1.13kg per a wooden frame of 515mm × 728mm. The thus treated sheet is slightly compressed to obtain the desired mat. After the wooden frame is removed, the mat is placed on a hot platen with a spacer and compressed for 5 minutes at 110° C. After it is cooled, a base having a thickness of 3mm and an apparent specific gravity of 1.0 can be obtained. A novolac type phenolic resin 5.0kg, hexamethylenetetramine 0.75kg, wood flour 5.0kg and suitable amounts of a lubricant and a coloring agent are kneaded for 20 minutes on a two roll mixer, one roll kept at 150° C. and the other at 80° C., and the resulting mixture is then pulverized to obtain a molding mixture after cooling. This molding mixture which has been formed into a slurry by adding methanol thereto is coated on the base and dried. The resulting matrix molding board is first softened and then becomes cured as soon as it is heated and compressed together with an original form, and is able to faithfully and clearly copy the image of the original form without harming the original form because of its excellent plasticity on heating.

For comparison in plasticity on heating and curability of a matrix between the present one and a conventional one, the respective matrix molding boards are prepared from the base obtained above, and a base obtained by the conventional process which has been described before. The result of the measurement is illustrated in Tables 1 and 2.

Plasticity on heating is measured as follows. A type matter covered with a matrix molding board is compressed for 5–10 minutes at 150° C. A measurement is made on the deformation of the type and the applied pressure to make the type go into the matrix molding board to a certain depth at that time. The height of the type is usually 23.50mm(0.923in). But, when the matrix is molded, the type is shortened because of the insufficient cushionability of the base. When the type is deformed or shortened by more than 0.10mm, a good printing plate is not obtained, causing many printing factors, such as long-run printing to be remarkably deteriorated. Therefore, it can be concluded that the lower the applied pressure is, and the smaller the deformation of the type is, the more excellent the matrix molding board is.

The curability is measured as follows. A type matter covered with a matrix molding board is compressed for 5–10 minutes at 150° C. to make the matrix have a depth of 1.2mm. This matrix is covered with a printing plate material prepared from a vinyl resin having a thickness of 2.0mm, and a spacer is fixed on a hot platen so that the thickness of the printing part may be 2.0mm, and that of the non-printing part 0.8mm, and the resulting assembly of the matrix and the printing plate material is compressed for 5 minutes at 150° C. to obtain a printing plate. The deformation of the thickness of the matrix after and before the molding of the printing plate is measured at this time. If the matrix is completely cured, no deformation will be caused in molding a printing plate. Therefore, it is evaluated that the smaller the deformation of the matrix is, the more excellent the matrix molding board is.

EXAMPLE 2

A molding mixture and a mat are prepared by the same process as in Example 1. 0.16 kg of the molding mixture is evenly sprinkled over the mat in a wooden frame, and after the frame is removed, the mat is placed on a hot platen with a spacer having a thickness of 3mm and compressed for 5 minutes at 110° C. After it is cooled, a matrix molding board having a thickness of 3mm can be obtained. This matrix molding board has a smooth surface and is excellent in curability and softenability and enables the image of the original form to be faithfully copied at a low pressure without harming the original form because of its excellent plasticity on heating. In addition, the molded matrix has no collapse when a printing plate is molded by using the matrix, and is also excellent in strength and toughness, having no cracking or breaking at all. The result of the measurement of its plasticity on heating and curability is shown in Tables 1 and 2.

EXAMPLE 3

A molding mixture 3kg prepared in the same manner as in Example 1 and methanol 7kg are mixed to form a paste. A paper having a thickness of 4 mils is immersed in this paste. The thus treated paper is allowed to cover over the mat described in Example 1. The treated mat is placed onto a hot platen with a spacer having a thickness of 3mm, and compressed for 5 minutes at 110° C. After it is cooled, a matrix molding board having a thickness of 3mm can be obtained. The result of the measurement of its plasticity on heating and curability is also shown in Tables 1 and 2.

EXAMPLE 4

A novolac type phenolic resin 5.0kg, hexamethylene tetramine 0.75kg, methanol 5.75kg and suitable amounts of a lubricant and a coloring agent are mixed to obtain a uniform varnish, and this varnish is impregnated into shirtings in order to have the resin in an amount of 60 percent by weight based on the total weight. The obtained resin impregnated shirtings are cut into a piece of sheet of 515mm × 728mm, on which is placed the mat covered with molding mixture which is prepared in the same as in Example 2. A spacer having a thickness of 3.2mm is placed on a hot platen and the treated mat is compressed between a pair of hot platens for 5 minutes at 110° C. After it is cooled, a matrix molding board having a thickness of 3.2mm is obtained. This matrix molding board is put on an original form heated at 150° C. with the surface layer down. On this matrix molding board is put a metal plate having a groove being 0.5 mm deep and 2mm wide at intervals of 15mm in the form of a grid and having perforated holes being 1mm in diameter on each crossing point of the grid with the grooved surface upside. After it is preheated for 1 minute and compressed for 10 minutes, such a good matrix as has no blister and no convex inflation thereon can be obtained.

In the same way as above, a good matrix having no blister or convex inflation thereon can also be obtained when a steel plate having perforated holes being 1mm in diameter at intervals of 1.5mm is used as the metal plate, or when both of this metal plate and a wire netting of 40 mesh are used, or when only this wire netting is used.

In stead of using an original form, the matrix molding board is molded on a frame made of an iron pillar having a cross-section of 20mm square. The concave of the back side of the matrix is measured. The value of the measurement is always less than 1mm.

EXAMPLE 5

A novolac type phenolic resin 7.5kg, hexamethylenetetramine 1.13kg and methanol 7.5kg are mixed to obtain a uniform varnish. Linter pulp 7.0kg, 5mm-long asbestos fibers 5.6kg, and suitable amounts of a lubricant and a coloring agent are mixed and the varnish is added to this mixture and uniformly mixed up. After drying up this mixture for 30 minutes at 80° C., it is refined on a disk-refiner. On the other hand, a novolac type phenolic resin 5.0kg, hexamethylenetetramine 0.75kg, wood flour 5.0kg and suitable amounts of a lubricant and a coloring agent are kneaded for 20 minutes on a tow roll mixer, one roll kept at 150° C., and the other at 80° C., and the mixture is pulverized to obtain a molding mixture. In a wooden frame being 515mm × 728mm, the refined composition is dry-formed and the molding mixture is sprinkled over a carrier and compressed slightly as to form a mat having the following layers alphabetically after all:

a. a layer of a mat obtained by dry-forming the refined composition 0.112kg
b. a layer of a molding mixture 0.112kg prepared from a thermosettable resin and a filler
c. a layer of a mat obtained by dry-forming the refined composition 0.870kg
d. a layer of the molding mixture 0.112kg The wooden frame is then removed and the mat is placed onto a hot platen with a spacer and then compressed for 5 minutes at 110° C. After it is cooled, a matrix molding board having a thickness of 3.2mm is obtained. The result of the measurement about its plasticity on heating and curability and warp is shown in Tables 2 and 3.

The warp is measured as follows. A flat metal plate being 200mm × 150mm covered with a matrix molding board is compressed for 10 minutes at 150° C. to form a matrix of a depth of 1.0mm and is cooled. The molded matrix has a saddle warp. The value of the warp is determined by measuring the maximum vertical distance from the diagonal of a matrix to the concave surface.

TABLE 1

| Base | Height of the type (mm) | Depth of the type which goes into (mm) | Heating time (min.) | Applied pressure (kg/cm$^2$) | Deformation of the type (mm) |
|---|---|---|---|---|---|
| Example 1 | 23.50 | 1.2 | 5 | 2.5 | 0.02 |
|  |  |  | 10 | 2.5 | 0.02 |
| Example 2 | 23.50 | 1.2 | 5 | 2.5 | 0.04 |
|  |  |  | 10 | 2.5 | 0.03 |
| Example 3 | 23.50 | 1.2 | 5 | 2.5 | 0.04 |
|  |  |  | 10 | 2.5 | 0.05 |
| Example 5 | 23.50 | 1.2 | 5 | 2.5 | 0.02 |
|  |  |  | 10 | 2.5 | 0.03 |
| Prepared from sheeting a beater resin pulp composition | 23.50 | 1.2 | 5 | 6.0 | 0.08 |
|  |  |  | 10 | 6.0 | 0.09 |
| Prepared from the resin impregnated sheet | 23.50 | 1.2 | 5 | 15.0 | 0.23 |
|  |  |  | 10 | 15.0 | 0.25 |

TABLE 2

| Base | Heating time for molding a matrix (min.) | Deformation of the thickness of the matrix (mm) |
|---|---|---|
| Example 1 | 5 | 0.05 |
|  | 10 | 0.02 |
| Example 2 | 5 | 0.04 |
|  | 10 | 0.01 |
| Example 3 | 5 | 0.04 |
|  | 10 | 0.02 |
| Example 5 | 5 | 0.06 |
|  | 10 | 0.02 |
| Prepared from sheeting a beater resin pulp composition | 5 | 0.35 |
|  | 10 | 0.10 |
| Prepared from the resin impregnated sheet | 5 | 0.65 |
|  | 10 | 0.55 |

TABLE 3

| Matrix molding board | Warp (mm) |
| --- | --- |
| Example 5 | 2 |
| Prepared from sheeting a beater resin pulp composition | 10 |
| Prepared from the resin impregnated sheet | 15 |

Tables 1, 2 and 3 show that the matrix molding board obtained by the process of this invention has excellent plasticity on heating and curability with less warp, and it is possible to mold a matrix for a very short time, causing less warp.

What we claim is:

1. A process for the production of a base for a shaped matrix for use in the molding of a printing plate, comprising the steps of:
   a. uniformly mixing fibrous materials and a thermosetting resin varnish to impregnate said fibrous materials with said thermosetting resin varnish and to provide a mixture thereof in the form of chips;
   b. drying said mixture to form dried chips;
   c. refining said dried chips into fibers to obtain a refined composition consisting of fine fibers having said thermosetting resin attached evenly thereto, said refined composition being non-cohesive at room temperature but cohesive at 80°–150° C.;
   d. dry-forming said refined composition into a mat of given thickness by allowing the fibers to fall down and lie in random directions over a carrier;
   e. compressing said mat at 80°–150° C. between a pair of heated platens with a spacer having a fixed thickness so that said thermosetting resin in said mat becomes molten but still remains uncured so that it may be subsequently molded and cured into a matrix, and so that said fibers are bonded with said molten resin to one another, to provide a compressed mat; and
   f. cooling said compressed mat to solidify said uncured resin to thereby provide said base for a matrix molding board.

2. A process in accordance with claim 1 for the production of a matrix molding board, further comprising:
   g. coating said base on at least one side thereof with a molding mixture in fluent condition and comprising a second thermosetting resin and a filler; and
   h. solidifying said molding mixture on said base to provide said matrix molding board having a surface layer and a back; whereby
   said matrix molding board may be subsequently molded against an original form under heat and pressure to shape the surface of said matrix molding board to cure said first mentioned thermosetting resin and said second thermosetting resin and to form a shaped matrix.

3. A process in accordance with claim 1 for the production of a matrix molding board comprising:
   carrying out said steps (a), (b), and (c); carrying out said step (d);
   d-1. applying to one side of said mat a layer of a powdery molding mixture of a second thermosetting resin and a filler, whereby said compressing operation of said step (e) also causes said second thermosetting resin to become molten thereby bonding said filler to said mat, said second thermosetting resin remaining uncured, to thereby provide after said cooling step (f) said matrix molding board.

4. A process in accordance with claim 3 further comprising:
   d-2. after said step (d-1) applying heat to said layer of powdery molding mixture to sinter together the thermosetting resin powder.

5. A process in accordance with claim 1 for the production of a matrix molding board comprising:
   carrying out said steps (a), (b), (c) and (d); and
   d-1. applying to one side of said mat a preformed base sheet impregnated with a second thermosetting resin, whereby said compressing of said step (e) also causes said second thermosetting resin to become molten thereby bonding said base sheet to said mat, said second thermosetting resin remaining uncured to thereby provide after said cooling step (f) said matrix molding board.

6. A process in accordance with claim 3 comprising: after carrying out said steps (a), (b) and (c), then (c-1) providing a preformed sheet impregnated with a third thermosetting resin; and then carrying out said steps (d) and (d-1) by applying said refined composition over said preformed sheet to form said mat and then applying said powdery mixture of said second thermosetting resin and filler to the top of said mat; whereby said compressing of said step (e) also causes said third thermosetting resin to become molten thereby bonding said preformed sheet to said mat to form a balance layer, said third thermosetting resin remaining uncured.

7. A process in accordance with claim 1 for the production of a matrix molding board comprising:
   carrying out said steps (a), (b), (c) and (d), wherein in step (d) two to eighty parts by weight of said refined composition is deposited to provide said mat;
   d-1. applying to the top of said mat one to sixteen parts by weight of a powdery molding mixture of a second thermosetting resin and a filler to form a first layer over said mat;
   d-2. dry-forming 20-80 parts by weight of a second quantity of said refined composition by allowing the fibers to fall down and lie in random directions in the form of a second mat over said first layer on said first mentioned mat;
   d-3. applying to the top of said second mat four parts by weight of a second quantity of said powdery molding mixture;
   whereby said compressing of said step (e) causes said layers and mats to become bonded together, without curing of said thermosetting resins, to thereby provide after said cooling step (f) said matrix molding board.

8. A process in accordance with claim 2 for the production of a shaped matrix such as for use in making printing plates, further comprising:
   i. placing said back of said matrix molding bard on a metallic backing element having holes therin;
   j. placing an original form over said matrix molding board having said surface layer of said matrix molding board; and k. molding said surface layer of said matrix molding board against said original form and said back of said matrix molding board against said metallic backing under heat and pressure between heated platens to shape the surface layer of said matrix molding board and to cure said thermosetting resins thereby forming said shaped matrix.

* * * * *